Figure 1:
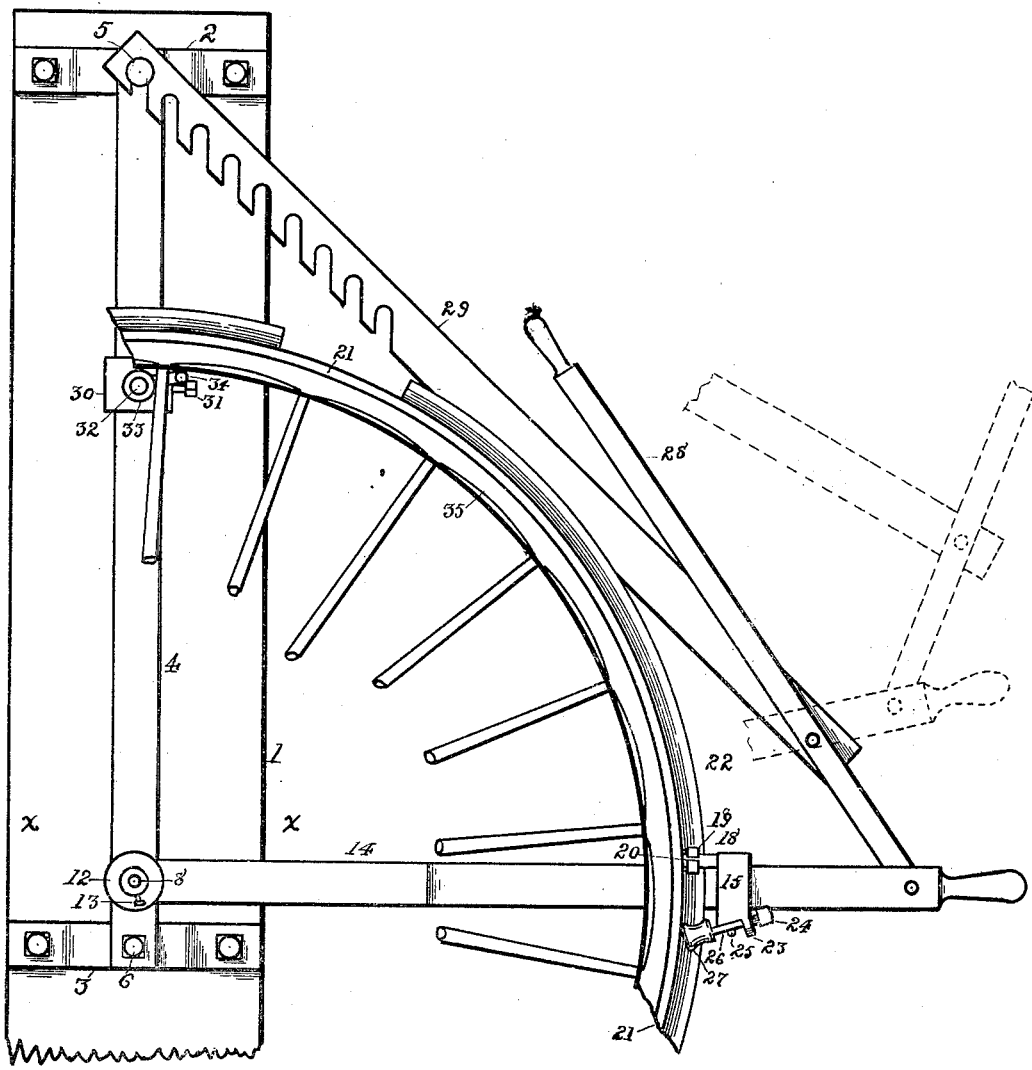

No. 700,895. Patented May 27, 1902.
J. A. BURROWS.
JOINT CLOSER FOR RUBBER TIRE SETTING MACHINES.
(Application filed July 31, 1901.)
(No Model.) 2 Sheets—Sheet 1.

Witnesses
Will State
Maude Ginsler

Inventor:
Joseph A. Burrows,
by Humphrey & Humphrey,
Attys.

No. 700,895. Patented May 27, 1902.
J. A. BURROWS.
JOINT CLOSER FOR RUBBER TIRE SETTING MACHINES.
(Application filed July 31, 1901.)
(No Model.) 2 Sheets—Sheet 2.

Witnesses:
Will State
Maude Grinsler

Inventor:
Joseph A. Burrows,
By Humphrey & Humphrey,
Attys.

THE NORRIS PETERS CO., PHOTO-LITHO., WASHINGTON, D. C.

UNITED STATES PATENT OFFICE.

JOSEPH A. BURROWS, OF AKRON, OHIO, ASSIGNOR TO THE GOODYEAR TIRE AND RUBBER COMPANY, OF AKRON, OHIO.

JOINT-CLOSER FOR RUBBER-TIRE-SETTING MACHINES.

SPECIFICATION forming part of Letters Patent No. 700,895, dated May 27, 1902.

Application filed July 31, 1901. Serial No. 70,402. (No model.)

*To all whom it may concern:*

Be it known that I, JOSEPH A. BURROWS, a citizen of the United States, residing at Akron, in the county of Summit and State of Ohio, have invented a certain new and useful Improvement in Joint-Closers for Rubber-Tire-Setting Machines, of which the following is a specification.

My invention has a general relation to improvements in that class of machines designed for placing solid-rubber tires on vehicle-wheels having metallic channeled tires to receive and retain the rubber tires. These rubber tires are ordinarily constructed in straight strips of required shape in cross-section of sufficient length to encircle the metallic tire and are provided with one or preferably two embedded longitudinal wires, and in placing or setting these tires the wires are cut of such length that the ends of the same wire will under great tension about the wheel lap upon each other to permit of their union by brazing or other means of uniting them, while the rubber tire is cut somewhat longer and slipped back along the wires from each end, so that when the wires are brazed the ends of the rubber tire will be separated for a considerable distance, and these ends are afterward joined by working the rubber by compression and manipulation forward from each direction toward their point of union, thus sliding the ends and a considerable portion back of them along the wires until these ends meet over and cover the joint in the wires, when they are cemented together.

The object of my invention is to produce a machine to facilitate this operation of bringing forward the ends of the rubber tire after the ends of the wires shall have been drawn tight and secured together, which shall embody means for slightly raising the rubber tire from the channeled metallic tire to permit it to slide more freely therein and along the wires to the point of union and coacting mechanism to compress the sides of the rubber tire to force the fullness thereof toward the same point; and its further object is to provide a system of levers to operate these devices, one whereof shall be adapted to be used at the commencement of sliding the ends of the rubber tire forward when the resistance to be overcome is slight, and the second to operate the first with greater power as the resistance increases, which second lever shall be provided with a fulcrum having an adjustable anchorage to permit the parts which operate directly on the tire to approach more nearly the point of the union.

To the accomplishment of the aforesaid objects my invention consists in the peculiar and novel construction, arrangement, and combination of parts hereinafter described and then specifically pointed out in the claims, reference being had to the accompanying drawings, which form a part of this specification.

Figure 2:
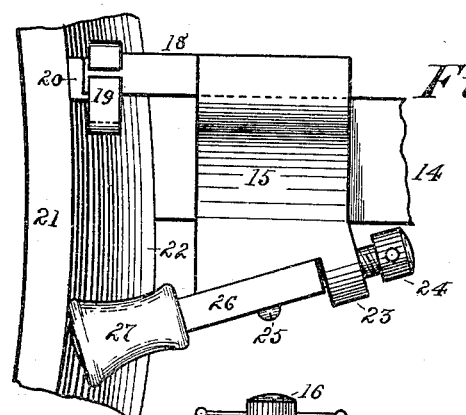
Figure 3:
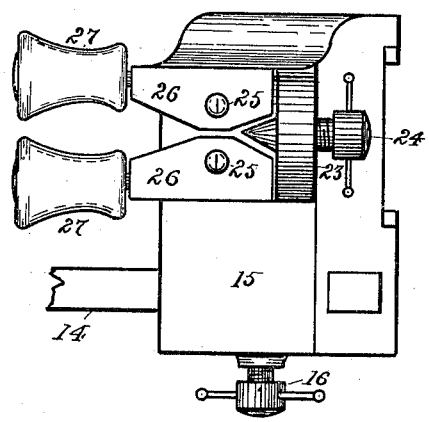
Figure 4:
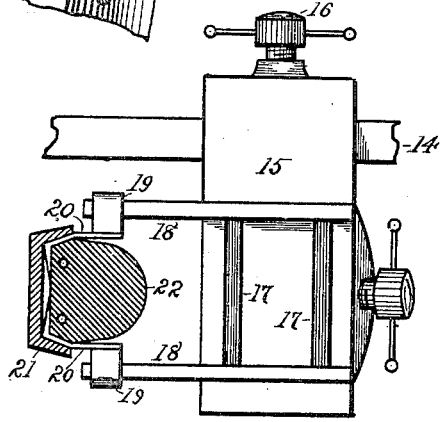
Figures 5, 6:
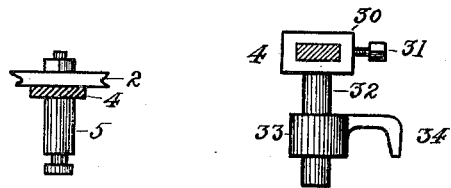
Figure 7:
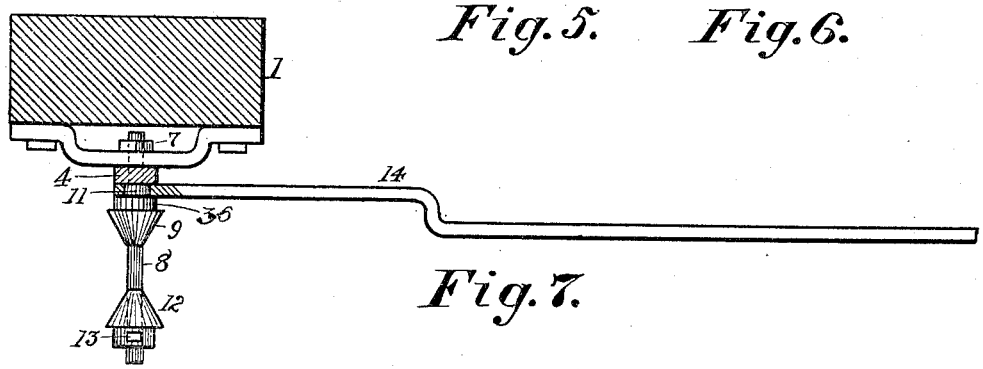

In the accompanying drawings, in which similar reference-numerals indicate like parts in the different figures, Figure 1 is an elevation of my improved machine applied to the placing of a rubber tire on a wheel, the latter, as well as the post which supports the machine, being partially broken away; Fig. 2, a detailed portion of Fig. 1, greatly enlarged; Fig. 3, an inverted plan of the mechanism shown in Fig. 2 on the plane of the roller-bars with the tire-raising blades omitted; Fig. 4, a plan of the same on the plane of the top of Fig. 2 with the rollers omitted; Fig. 5, a plan of the anchor-pin and connected parts with the supporting-bar in section; Fig. 6, a plan of the wheel-holding hook and its supporting-rod with the supporting-bar in section; and Fig. 7, a section of the supporting-post at the line $x$ $x$ of Fig. 1, with the first or lower lever broken at its pivotal end to show the construction of the pivot.

Referring to the figures, 1 is an upright post or beam, to the upper and lower portions of the same face of which are bolted like metallic bars 2 3, the central portions of which are bent outward, and to these central portions is bolted a straight flat bar 4, the bolt 5, which retains the upper end, (shown in detail in Fig. 5,) as hereinbefore stated, being larger in front of the bar 4, the parts of different diameter having a square shoulder at the dividing-line and having a channel or groove about it near its outer end, and the bolt 6, which retains the lower ends, being an ordinary headed bolt and nut.

Secured in the bar 4 near its lower end by a nut 7 is a bolt 8, having a cone 9, back of which is a cylindrical integral collar 36 and extending from which is a small cylindrical portion 11, with a square shoulder that bears on the bar 4, and this cylindrical portion 11 forms a pivot for a lever to be described. By this arrangement and construction the forcing back of the cone 9 will not bind the lever hereinbefore referred to, as the smaller portion 11 of the sleeve will bear against the bar 4, and thus prevent the larger portion pressing against the lever. At the outer end of the bolt 8 is a corresponding freely-mounted cone 12, adjustably retained by a set-screw 13.

Revolubly mounted on the portion 11 of the sleeve is a lever 14, terminating at its free end in a convenient handle and intermediately offset to permit it to lie close to the wheel-felly. A block 15 is mortised and fitted to slide on the lever 14, provided with a set-screw 16, by which it may be retained at any desired point. In the upper face of this block is a channel having sides parallel with the lever 14, across which at a right angle with the sides are two parallel guide-rods 17, secured at each end, and on these rods are freely mounted two bars 18, about each of which is a metal strap 19, free to slide thereon and having integral blades 20, that project toward the axle-bolt 8 and have their projecting ends ground tapering into practically sharp edges and are bent to fit the sides of the channeled metallic tire 21 and extend from each direction under the rubber tire 22. The lower face of the block 15 is beveled downward toward a point below the axle-bolt 8 and has at its outer end a depending lip 23, having a transverse screw-threaded opening in which runs a screw 24, having a conical point.

Pivotally mounted, by means of screws 25, on the lower face of the block 15 are two opsitely-disposed rocking bars 26, with their back ends beveled and arranged to be engaged and be forced apart by the screw 24 to cause their front ends to approach each other. The front ends of these bars 26 are reduced and rounded, and on these are revolubly mounted rollers 27, with their outer ends the largest and with curved sides.

Pivotally attached to the lever 14 near its outer end is one end of a lever 28, pivotally mounted on one end of a bar 29, the free end of which has a number of notches adapted to fit the bolt 5.

On the upright bar 4 is adjustably secured a slide 30, provided with a set-screw 31, from which slide extends a pin 32, on which is a free collar 33, having a hooked finger 34, adapted to engage one of the spokes of the wheel 35 and hold it against turning as the tire is being strained.

In operation the blades 20 are inserted under the tire in a preferred place, and the rubber tire having been placed about the wheel, the wires placed in tension and brazed, the hub of the wheel is mounted on the bolt 8 between and centered by the cones 9 and 12 and the finger 34 inserted between the spokes to hold the wheel against rotation. At this time the bar 29 is not hooked onto the bolt 5. The block 15 is then pushed forward and the ends of the bars 18 inserted in the straps 19 and the rollers 27 resting against its sides, but not compressing it, the lever 14 being away from the ends of the rubber tire for a considerable distance from the opening between the ends thereof and the screw 24 tightened to throw the rollers toward each other and the lever 14 rocked toward the ends of the rubber tire, this operation by means of the blades 20 slightly raising the rubber from the metal tire, while the rollers 27 compress and carry forward the fullness toward the opening to be closed. This operation is continued until the opening between the ends of the rubber is substantially half closed, when the wheel is removed and reversed on the bolt 8 and the operation repeated on the opposite side of the wheel until the ends of the rubber tire meet. In this operation when the resistance from the compression of the rubber tire becomes too great to be readily overcome by the simple lever 14 the bar 29 is hooked onto the bolt 5, and the lever 28, employed to swing up the end of the lever 14, as indicated in dotted lines in Fig. 1, and this may be repeated by hooking the bar 29 farther along on the bolt 5, as may be necessary to bring the levers into operative relation.

What I claim, and desire to secure by Letters Patent, is—

1. In a machine for bringing together the ends of solid-rubber tires, the combination with a pivot to support a wheel-hub, of a lever journaled at one end on said pivot bearing a sliding block, having rollers to press the sides of said tire, means for causing said rollers to approach and recede from each other, and bars secured to said block, substantially radial to said wheel having sliding straps thereon with blades to pass under said tire, substantially as shown and described.

2. The combination in a machine for bringing together the ends of solid-rubber vehicle-tires, of a frame, a journal for the wheel secured thereto, a lever radial with said wheel, means slidable on said lever for simultaneously raising said tire in the wheel-channel and compressing it laterally to force its fullness forward, substantially as shown and described.

3. In a machine for bringing together the ends of solid vehicle-tires, the combination with a supporting post or frame bearing near its top an anchor-pin, and below it a pivot for the wheel, of a lever pivoted on said wheel-pivot and bearing a longitudinally-movable block bearing rollers to compress the sides of the tire, and blades to slide under and raise said tire in advance of said rollers, in combination with a second lever pivoted to said first lever near its free end also pivoted to the free end of a bar, attached at its opposite end to said anchor-pin, substantially as shown and described.

4. In a machine for bringing together the ends of solid-rubber vehicle-tires, the combination with a supporting post or frame bearing a pivot for the wheel with means for centering the wheel thereon, of a lever journaled on said wheel-pivot bearing a longitudinally-movable block having rollers to compress the sides of the tire and blades to slide under and raise said tire in advance of said rollers, and a second lever pivoted to said first lever, mounted on a movable fulcrum connected with said frame and adjustable with reference thereto, substantially as shown and described.

5. In a machine for bringing together the ends of solid-rubber vehicle-tires, the combination with a supporting post or frame, having a pivot for the wheel-hub, and an anchor-pin, of a lever journaled on the wheel-pivot, and bearing a longitudinally-adjustable slide having means for raising, compressing and forcing forward the fullness of the tire, of an auxiliary lever pivoted to the free end of said first lever and journaled on a pin in a bar adjustably connected with said anchor-pin, substantially as shown and described.

6. An improved machine for bringing together the ends of solid-rubber vehicle-tires consisting of a supporting post or frame bearing an offset-bar with a pivot for the wheel, and an anchor-pin; a lever journaled on said wheel-pivot, with a sliding block thereon having rocking bars having revoluble rollers to compress the sides of the tire, and means for rocking said bars to cause said rollers to approach or recede from each other, and parallel bars adapted to approach and recede from each other having slides bearing blades to pass under and raise said tire; a bar having notches to engage said anchor-pin, and a lever fulcrumed on the free end of said bar and pivoted near the free end of said first lever, substantially as shown and described.

In testimony that I claim the above I hereunto set my hand in the presence of two subscribing witnesses.

JOSEPH A. BURROWS.

In presence of—
FLORENCE C. DUN,
C. E. HUMPHREY.